United States Patent [19]

Custer et al.

[11] Patent Number: 5,046,300
[45] Date of Patent: Sep. 10, 1991

[54] METHOD AND APPARATUS FOR FORMING A RECLOSABLE PACKAGE

[75] Inventors: Richard G. Custer; Richard R. Kosiorek; Michael P. Kolosso, all of Appleton, Wis.

[73] Assignee: Reynolds Consumer Products, Inc., Appleton, Wis.

[21] Appl. No.: 600,756

[22] Filed: Oct. 19, 1990

[51] Int. Cl.$^5$ .......................... B65B 9/06; B65B 61/18
[52] U.S. Cl. ........................................ 53/412; 53/451; 53/551; 53/133.3; 493/297; 493/302; 156/66
[58] Field of Search ................. 53/410, 412, 451, 128, 53/133, 551; 493/213, 927, 297, 302; 156/66

[56] References Cited

U.S. PATENT DOCUMENTS

| 2,761,633 | 9/1956 | Sindzinski | 243/38 |
|---|---|---|---|
| 2,978,769 | 4/1961 | Harrah . | |
| 3,140,030 | 7/1964 | Stewart | 226/95 |
| 3,198,228 | 8/1965 | Naito . | |
| 3,219,084 | 11/1965 | Ausnit et al. . | |
| 3,285,485 | 11/1966 | Slator | 226/172 |
| 3,381,592 | 5/1968 | Ravel . | |
| 3,473,589 | 10/1969 | Götz . | |
| 3,506,517 | 4/1970 | Naito . | |
| 3,681,890 | 8/1972 | Pringle, Jr. et al. . | |
| 3,685,562 | 8/1972 | Ausnit . | |
| 3,780,781 | 12/1973 | Uramoto . | |
| 3,807,118 | 4/1974 | Pike . | |
| 3,815,317 | 6/1974 | Toss . | |
| 3,839,128 | 10/1974 | Arai . | |
| 3,889,446 | 6/1975 | Simmons | 53/451 |
| 3,948,705 | 4/1976 | Ausnit . | |
| 4,046,408 | 9/1977 | Ausnit . | |
| 4,101,355 | 7/1978 | Ausnit . | |
| 4,136,505 | 1/1979 | Putnam, Jr. et al. . | |
| 4,174,597 | 11/1979 | Mowly | 493/927 X |
| 4,235,064 | 11/1980 | Wenger . | |
| 4,240,241 | 10/1980 | Sanborn, Jr. . | |
| 4,246,288 | 1/1981 | Sanborn, Jr. . | |
| 4,277,302 | 7/1981 | Reid . | |
| 4,288,965 | 9/1981 | James . | |
| 4,354,541 | 10/1982 | Tilman . | |
| 4,355,494 | 10/1982 | Tilman | 53/128 |
| 4,391,079 | 7/1983 | Cherney . | |
| 4,391,081 | 7/1983 | Kovacs . | |
| 4,423,585 | 1/1984 | Monsees et al. . | |
| 4,437,293 | 3/1984 | Sanborn, Jr. . | |
| 4,501,109 | 2/1985 | Monsees . | |
| 4,532,754 | 8/1985 | Hokanson . | |
| 4,589,145 | 5/1986 | Van Erden . | |
| 4,617,683 | 10/1986 | Christoff | 53/451 |
| 4,620,409 | 11/1986 | McElvy . | |
| 4,625,496 | 12/1986 | Ausnit . | |
| 4,646,511 | 3/1987 | Boeckmann . | |
| 4,655,862 | 4/1987 | Christoff et al. . | |

(List continued on next page.)

FOREIGN PATENT DOCUMENTS 0276554 8/1988 European Pat. Off. .
1546433 10/1976 United Kingdom .

OTHER PUBLICATIONS

Six-page brochure entitled "Triangle Form-Fill-Seal Systems", published by Triangle Package Machinery Company.
Two-page document entitled "Vertical Form-Fill-Seal Packaging Machine KBF-608Z, KBF-608ZW" published by Kawashima Packaging Machinery Ltd.

Primary Examiner—John Sipos
Attorney, Agent, or Firm—Willian Brinks Olds Hofer Gilson & Lione

[57] ABSTRACT

A method and an apparatus for applying a reclosable profile element to a packaging film is disclosed. Packaging film is formed into a tubular form about a forming tube. The tubular shaped packaging film is advanced along the length of the forming tube and over a product fill tube having an outer perimeter less than the outer perimeter of the forming tube. The packaging film is deformed to conform to the outer perimeter of the product fill tube. Excess packaging film, made available due to the differences in outer perimeters of the forming tube and product fill tube, is formed into a loop. A reclosable profile element is guided into the loop and adhered to the inner surface of the loop.

29 Claims, 6 Drawing Sheets

U.S. PATENT DOCUMENTS

| | | |
|---|---|---|
| 4,663,915 | 5/1987 | Van Erden . |
| 4,698,954 | 10/1987 | Behr et al. . |
| 4,704,842 | 11/1987 | Boeckmann . |
| 4,709,528 | 12/1987 | Merkus . |
| 4,709,533 | 12/1987 | Ausnit . |
| 4,727,709 | 3/1988 | Zieke et al. . |
| 4,745,731 | 5/1988 | Talbott ................................ 53/551 |
| 4,782,951 | 11/1988 | Griesbach et al. . |
| 4,790,126 | 12/1988 | Boeckman ............................ 53/451 |
| 4,840,012 | 6/1989 | Boeckman ............................ 53/133 |
| 4,848,928 | 7/1989 | Ausnit . |
| 4,869,048 | 9/1989 | Boeckmann . |
| 4,874,257 | 10/1989 | Inagaki . |
| 4,876,842 | 10/1989 | Ausnit . |
| 4,894,975 | 1/1990 | Ausnit ................................. 53/412 |
| 4,993,212 | 2/1991 | Veoukas ............................... 53/451 |

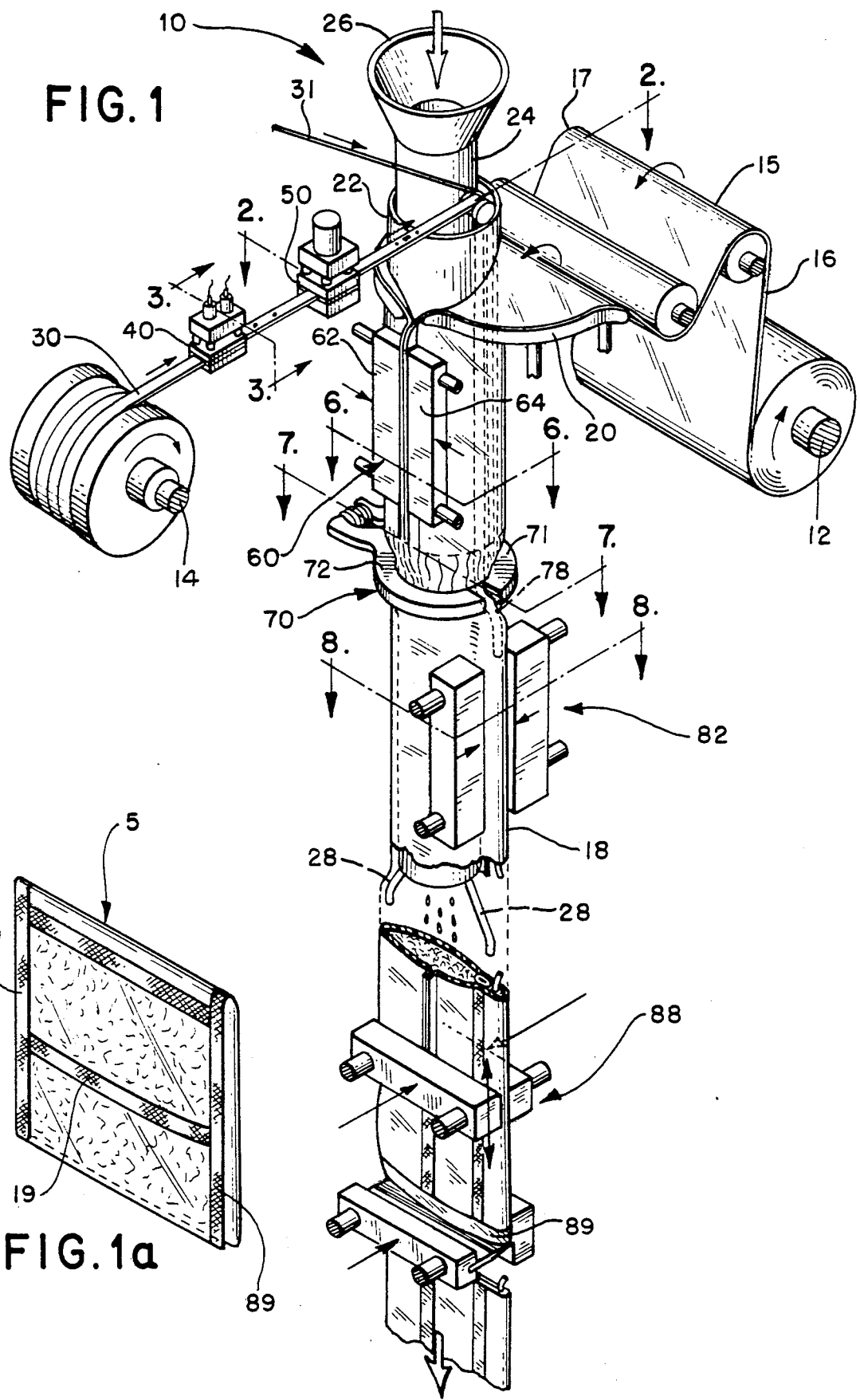

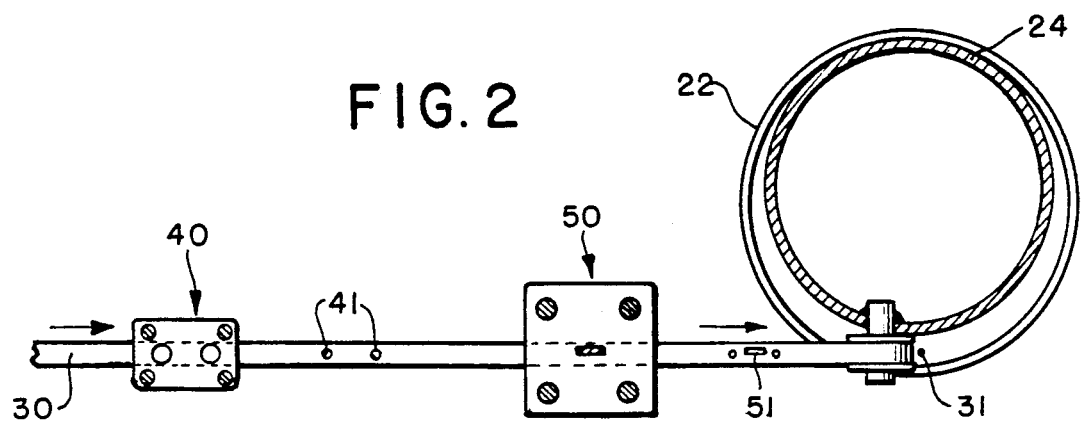
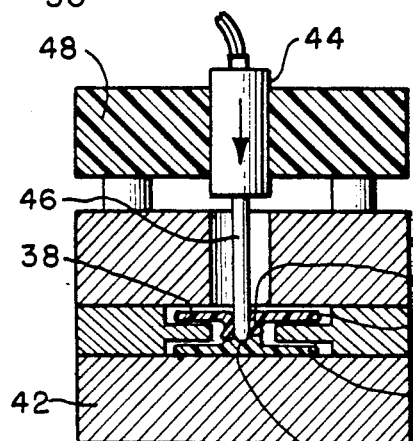
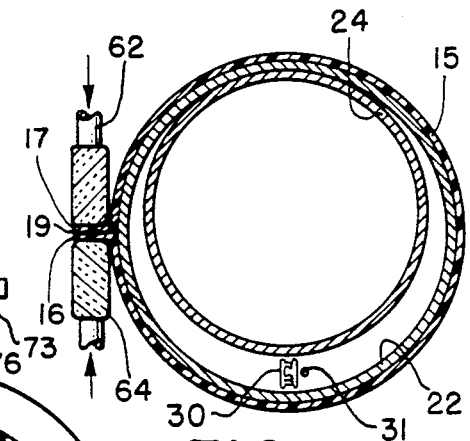
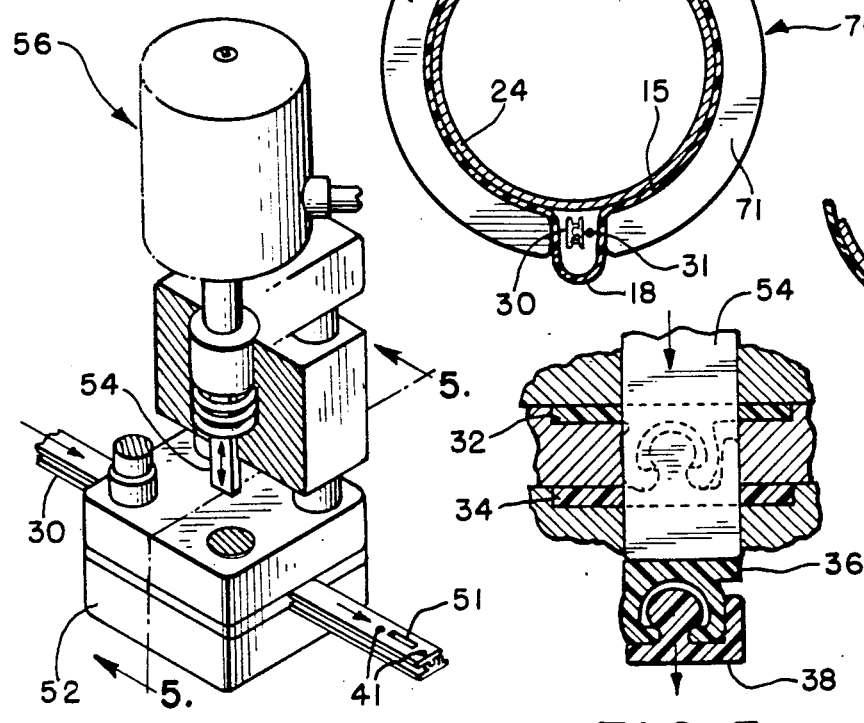
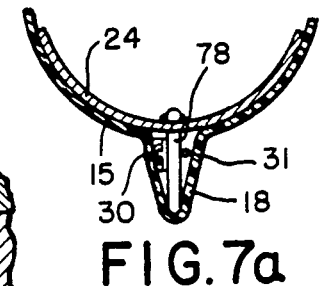

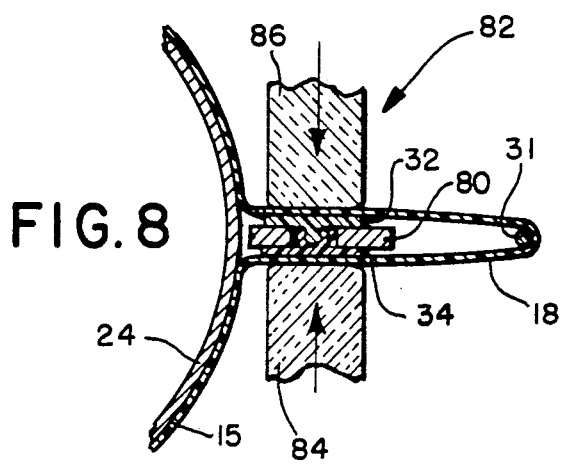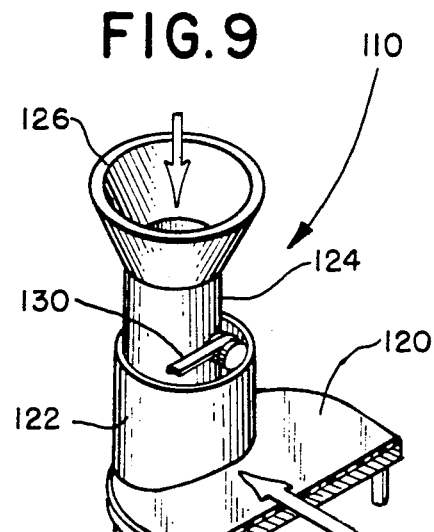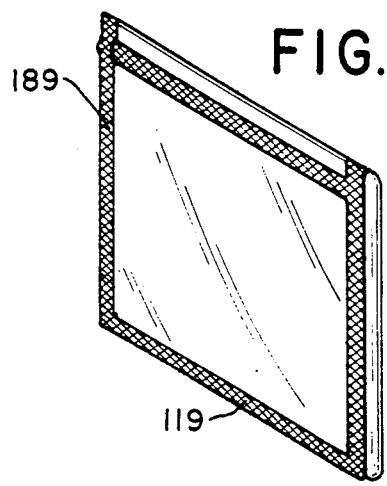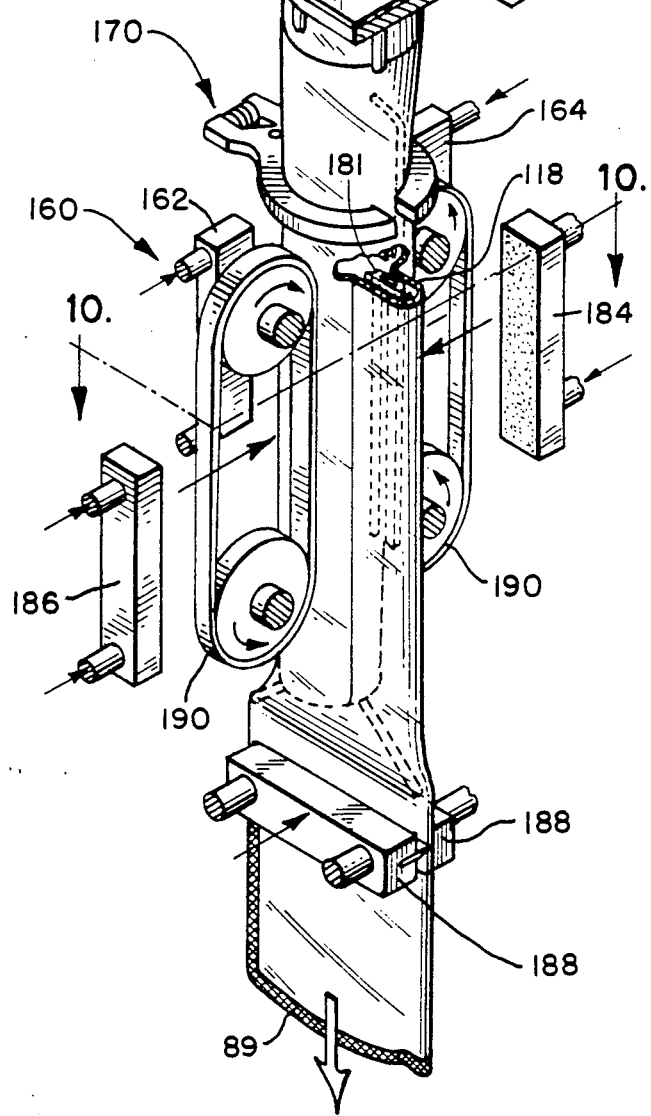

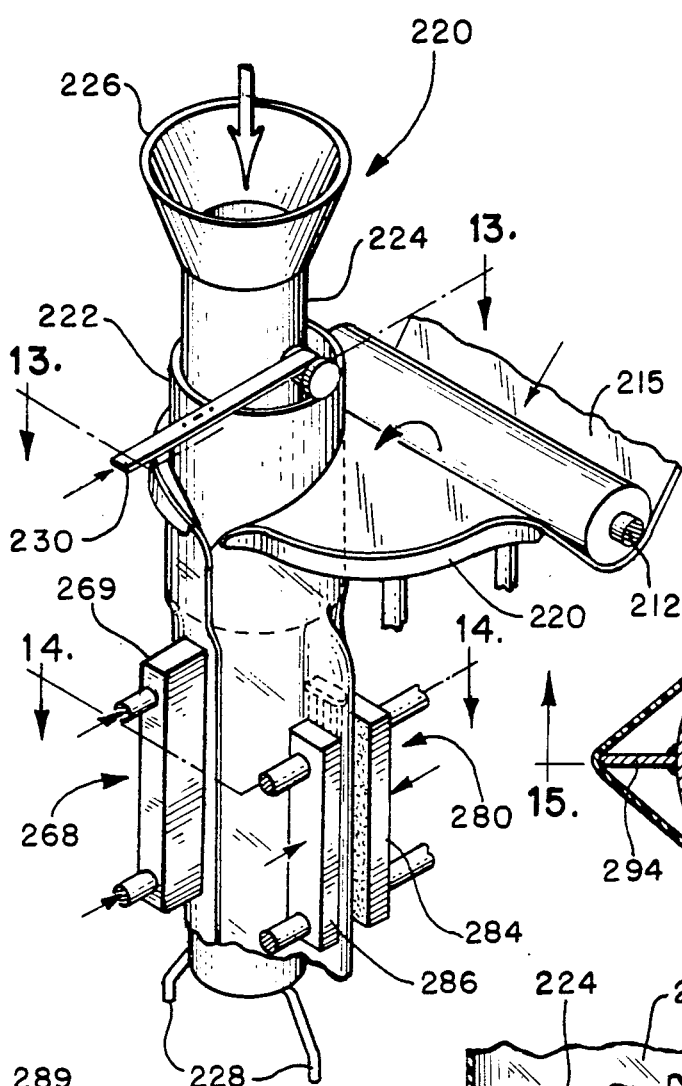
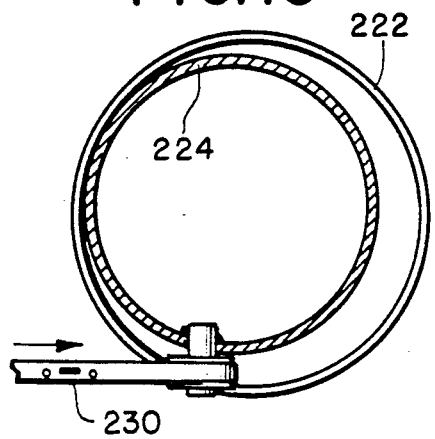
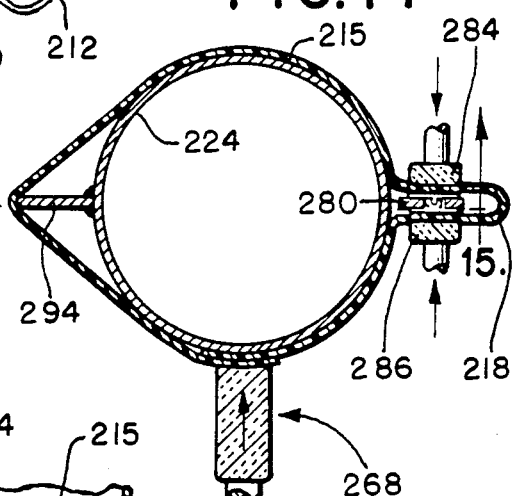
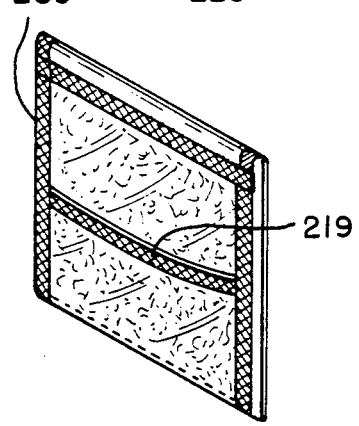
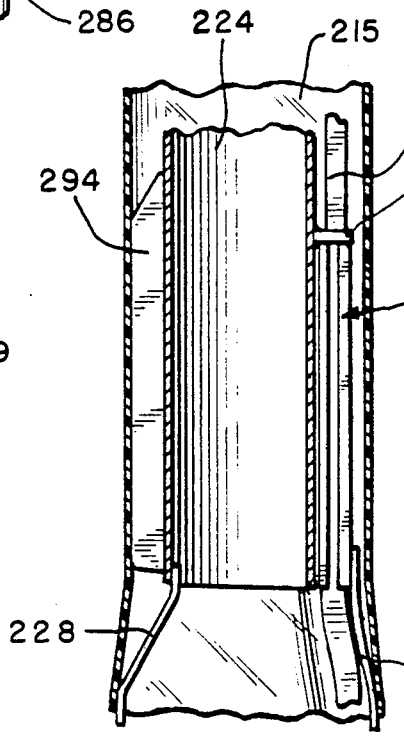

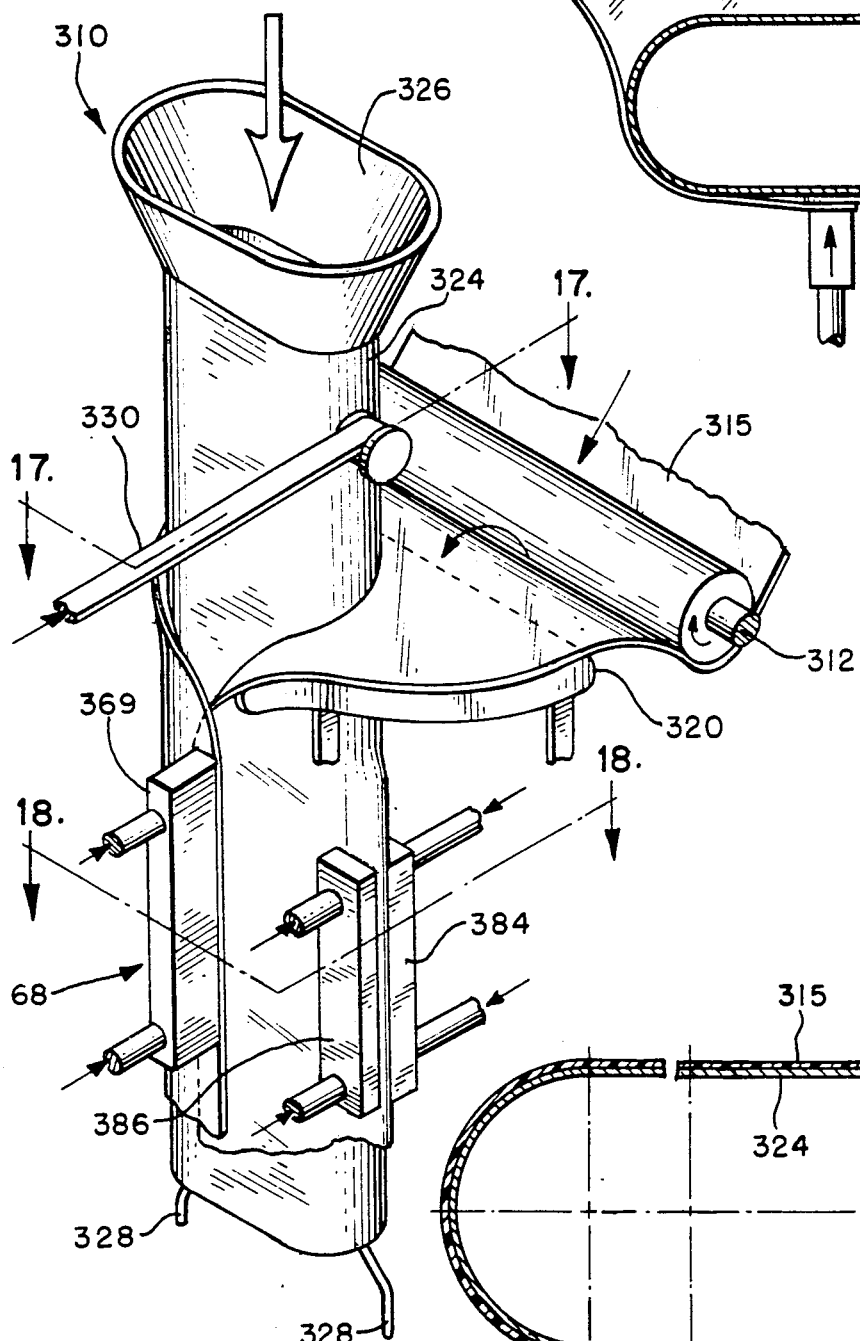
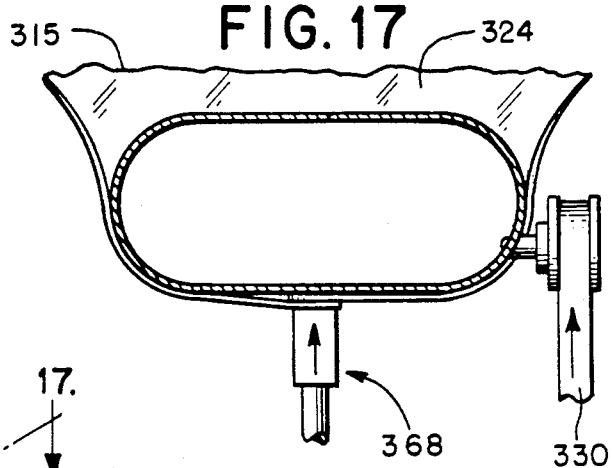
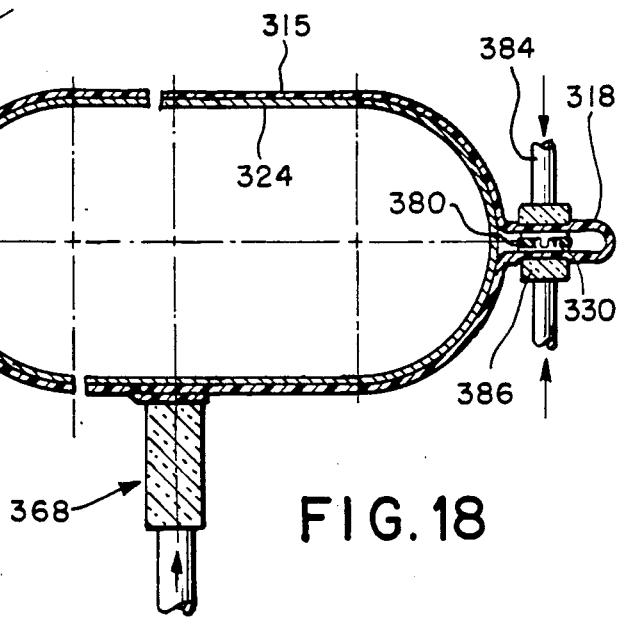
FIG. 16
FIG. 17
FIG. 18

METHOD AND APPARATUS FOR FORMING A RECLOSABLE PACKAGE

BACKGROUND OF THE INVENTION

The present invention relates to the field of reclosable packages and an apparatus used to apply closure elements to a packaging film and form such packages. More particularly, the invention relates to a method and apparatus for applying reclosable profile elements to a packaging film in a form, fill and seal packaging operation.

One method of forming packages is known as the form, fill and seal method, wherein a continuous length of film is fed forwardly and downwardly over a forming tube, with the marginal edges of the sheet of film being sealed to each other. The thus formed tube of film is cross-sealed, and contents are dropped into the package through the tubular mandrel over which the packaging film is formed. An additional cross seal above the contents completes the package, which is then severed from the tubular film.

Reclosable packages having male and female cooperating reclosable elements along an opening or seam of the package have been known for some time.

There are several advantages to forming product containing packages with such reclosable fasteners. As such, several methods have been developed to produce packages with reclosable fasteners on form, fill and seal equipment.

Many of these methods utilize packaging film which already includes the reclosable profile element affixed to the packaging film, or uses packaging film wherein the reclosable element is formed integral with the film web. By way of example, the following U.S. Patents disclose various methods of utilizing such packaging film in forming reclosable packages:

U.S. Pat. No. 4,840,012 discloses a method and apparatus for improving the advancement of packaging film, in a form, fill and seal apparatus.

U.S. Pat. No. 4,689,954 discloses a guide mechanism disposed within the packaging film to align the feeding of the film into the filling portion of the form, fill and seal apparatus.

U.S. Pat. No. 4,727,709 discloses a steering, joining and guiding mechanism for joining together opposing rib and groove fastener elements present along the longitudinal border on a traveling continuous packaging film as the film is formed into a package.

U.S. Pat. No. 4,745,731 discloses a method and apparatus for forming reclosable storage containers wherein interconnecting members of a profile element, present along the outer border of the film, must be aligned after the film is wrapped about a forming shoulder of a form, fill and seal apparatus.

U.S. Pat. No. 4,625,496 discloses a method of moving a sheet of packaging film having a profile element integral therewith over a forming shoulder of a form, fill and seal apparatus.

U.S. Pat. No. 4,617,683 discloses reclosable bags and a method of making the same. The bags are formed from material having an extruded reclosable plastic fastener extending across the longitudinal formation axis of the packaging material prior to formation of the bags.

U.S. Pat. No. 4,790,126 discloses a fill and seal machine for reclosable bags wherein the bags are made from packaging material having zipper profiles attached equidistant from the film edges prior to feeding the material into the form, fill and seal apparatus. The open zipper profile must then be closed during an indexing cycle on the form, fill and seal apparatus.

One problem with methods and apparatus which use packaging film with reclosable profiles already attached to the packaging film is that the desired combined packaging film and reclosable profile shape must be obtained for all desired combinations of packaging film, film widths, profile shape and profile locations. Another problem is that it is more bulky to store the combined profile and film than to store the elements separately.

Several methods have been developed wherein profiles are attached to a packaging film just prior to the introduction of the packaging film into the form fill and seal apparatus. For example, see U.S. Pat. No. 4,355,494, which discloses an apparatus for making reclosable packages wherein the reclosable packages are formed by applying the profile element to the longitudinal edges of a traveling web of packaging material. The profile elements are then joined together by multiple roller pairs which guide the profiles into engagement between a pair of press rolls.

While these methods overcome the above noted problems, they require additional equipment to compensate for the difference in the intermittent operation of the form, fill and seal equipment and the preferred continuous adhering of the reclosable profile strips to the packaging film.

Another prior art method applies the profile strips intermittently. U.S. Pat. Nos. 4,709,533 and 4,894,975 disclose a method and apparatus for forming a reclosable package wherein a reclosable profile is adhered to the outer edges of the packaging film as the edges are brought together and a fin seal is formed on a form, fill and seal machine.

One disadvantage with this disclosed method of applying the profile strips while the packages are being formed is that the resulting packages have the reclosable element between the fin seal and the package contents. It would be preferable to ba able to place the reclosable profile at other places on the package structure, such as at a package side opposite the fin seal on a three sided seal package, or on one of the side edges of a pillow package.

SUMMARY OF THE INVENTION

The present invention provides a method and apparatus for applying a reclosable fastener to a packaging film during the form, fill and seal formation of a package, and allows the reclosable profile to be placed other than at the fin seal.

In one aspect, the invention is an apparatus for applying a reclosable profile element to a packaging film, the apparatus including a central member having an upper section and a lower section, the upper section including means for forming a longitudinally extending web of packaging film with marginal edges into a tube about a perimeter of the upper section, the lower section having an outer perimeter which is less than the tube forming perimeter of the upper section; a means for generating a loop in the packaging film, the loop running generally parallel to the axis of the tube, and utilizing packaging film which is in excess of the portion of the tube required to conform the tube to the outer perimeter of the lower section; a means for threading a reclosable profile element into the loop of packaging film; and a means for adhering the reclosable profile element to the inner surface of the loop of packaging film.

In another aspect, the invention is a method of applying a reclosable profile element to a packaging film which includes the steps of forming a web of packaging film over a shoulder and into a tubular shape about a central member having an upper section and a lower section; joining the marginal edges of the packaging film to form the film into a tube having a perimeter larger than the outer perimeter of the lower section; advancing the tube of packaging film along the length of the central member; forming a longitudinally extending loop in the packaging film from an excess of packaging film made available by conforming the tubular packaging film to follow the outer perimeter of the lower section of the central member as the packaging film is advanced along the length of the central member; threading a reclosable profile element along the length of the central member and into the loop of film; and adhering the reclosable profile element to the inner surface of the loop.

In a preferred embodiment of the present invention, a pillow pack product filled package having reclosable profile elements is formed by forming a fin seal along a vertical length in the packaging film 90° from the loop in which the reclosable profile element is adhered.

In another preferred embodiment of the present invention, a three-sided sealed product filled package having reclosable profile element is formed by forming a fin seal along a vertical side of the package, 180° from the loop in which the reclosable profile element is adhered.

The invention has the advantage that different profiles and films can be combined in an interchangeable fashion on the packaging equipment, yet the equipment is very simple. An additional advantage of the present invention is that it provides a reclosable package which is also tamper resistant, since the reclosable elements are inside of a contiguous loop of film. A purchaser of a reclosable package made in accordance with the present invention can see that he is obtaining a previously unused and unopened package.

These and other advantages, as well as the invention itself, will be best understood with reference to the detailed description below, read in conjunction with the accompanying drawings.

BRIEF DESCRIPTION OF THE DRAWINGS

FIG. 1 is a perspective view of a preferred embodiment of the present invention.

FIG. 1a is a perspective view of a reclosable package made in accordance with a preferred embodiment of the present invention.

FIG. 2 is a cross-sectional view taken along line 2—2 of FIG. 1.

FIG. 3 is a cross-sectional view taken along line 3—3 of FIG. 1.

FIG. 4 is an expanded view of an air cylinder punch utilized with a preferred embodiment of the present invention.

FIG. 5 is a partial cross-sectional view taken along line 5—5 of FIG. 4.

FIG. 6 is a cross-sectional view taken along line 6—6 of FIG. 1.

FIG. 7 is a cross-sectional view taken along line 7—7 of FIG. 1.

FIG. 7a is a partial cross-sectional view of a fin shaper utilized on some embodiments of the present invention, taken just below line 7—7 of FIG. 1.

FIG. 8 is a partial cross-sectional view taken along line 8—8 of FIG. 1.

FIG. 9 is a perspective view of another preferred embodiment of the present invention.

FIG. 9a is a perspective view of a reclosable package made in accordance with a preferred embodiment of the present invention.

FIG. 12 is a perspective view of another a preferred embodiment of the present invention.

FIG. 12a is a perspective view of a reclosable package made in accordance with a preferred embodiment of the present invention.

FIG. 13 is a cross-sectional view taken along line 13—13 of FIG. 12.

FIG. 14 is a cross-sectional view taken along line 14—14 of FIG. 12.

FIG. 15 is a cross-sectional view taken along line 15—15 of FIG. 14.

FIG. 16 is a perspective view of another preferred embodiment of the present invention.

FIG. 17 is a cross-sectional view taken along line 17—17 of FIG. 16.

FIG. 18 is a cross-sectional view taken along line 18—18 of FIG. 16.

DETAILED DESCRIPTION OF THE DRAWINGS AND PREFERRED EMBODIMENTS

Figure 10:
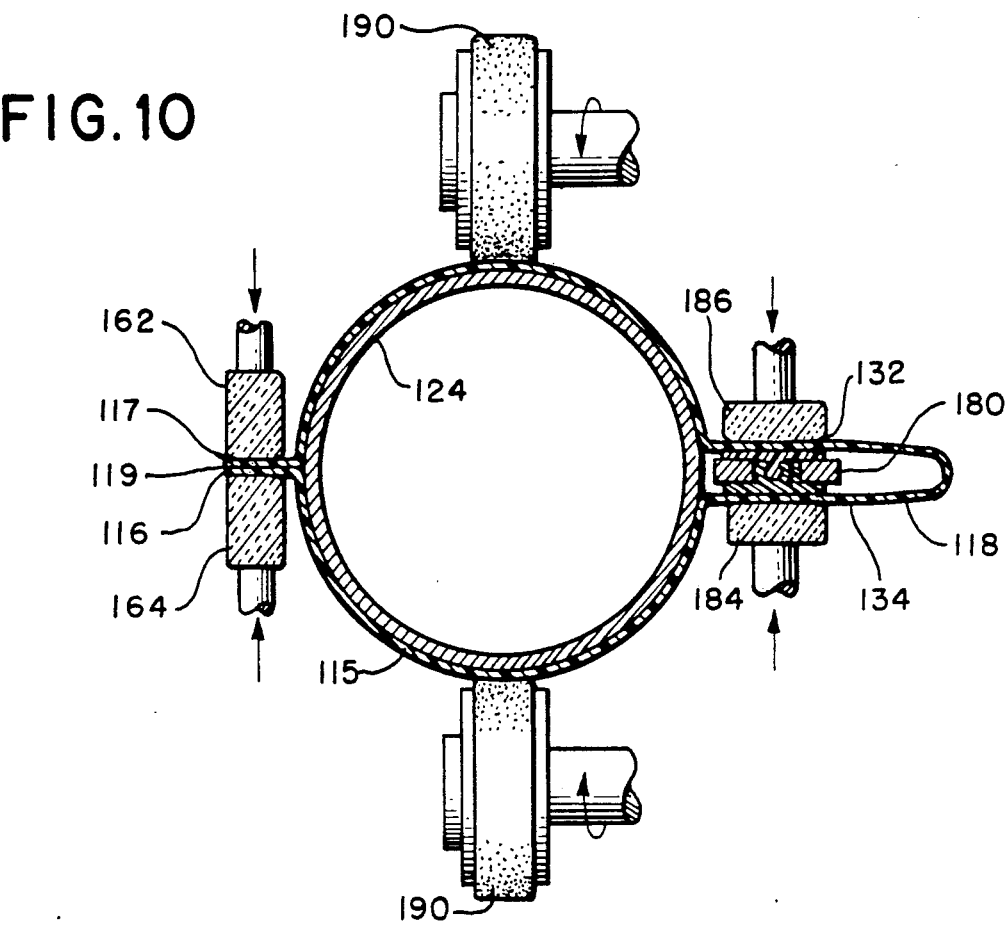
FIG. 10 is a cross-sectional view taken along line 10—10 of FIG. 9.

Referring now to the drawings, FIG. 1 illustrates a perspective view of a preferred embodiment of the present invention. Generally, a sheet of packaging film 15 is released from an unwind apparatus 12 and formed into a reclosable package. Preferably, the reclosable package is formed on a form, fill and seal apparatus 10. The form, fill and seal apparatus 10 of the preferred embodiment of FIG. 1 includes a central member made up of a forming shoulder 20, a forming tube 22, and product fill tube 24.

The forming shoulder 20 is adjacent to the forming tube 22 and is positioned to shape flat packaging film 15 received from the unwind apparatus 12 into a tubular form about the forming tube 22. In this embodiment, the forming shoulder 20 and forming tube 22 comprise a means for forming the longitudinally extending web of packaging film 15 with marginal edges into a tube about a perimeter (in this case an outer perimeter) of the upper section of the central member.

Adjacent also to the forming tube 22 is a heat seal apparatus 60, which seals the marginal edges of the packaging film 15 into a tubular form. The heat seal apparatus includes seam seal bars 62 and 64 of a conventional design.

The outer perimeter of the lower section of the central member of the form, fill and seal apparatus of FIG. 1 is defined by the outer perimeter of the product fill tube 24. The product fill tube 24 has a lesser outer perimeter than the tube forming perimeter of the upper section. The product fill tube 24 is positioned internally within the forming tube 22 and extends below the bottom of the forming tube 22. Positioned at the uppermost end of the product fill tube is a funnel 26 which receives the product and directs the product down the product fill tube 24 and into a package being formed on the apparatus.

Preferably, positioned directly below the lowermost portion of the forming tube 22 is a film shaper 70. The film shaper 70 is a collar-like device and is positioned about the product fill tube 24. Preferably, the film shaper 70 has two arms 71 and 72 each with a hook-like extension 73 and 74 on one end, best seen in FIG. 7. Opposite the hook-like extensions 73 and 74, the arms 71 and 72 are spaced a distance apart, forming an opening. The arms 71 and 72 are bolted together by a pin 75. A spring 76 is mounted between the hook-like extensions 73 and 74 of the arms 71 and 72. The film shaper 70 surrounds the product fill tube 24.

Attached to the product fill tube 24 below the bottom end of the forming tube 22 is a pre-form fin 78, best shown in FIG. 7a. The pre-form fin 78 is attached on the product fill tube 22 approximately at the same vertical height as the height at which the film shaper 70 encircles the product fill tube 24. The pre-form fin 78 is aligned on the product fill tube 24 to be within the opening formed between the arms of the film shaper 70.

Attached also to the product fill tube 24 is a sealing guide backup 80, best seen in FIG. 8. The sealing guide backup 80 is a two piece rigid device that is attached vertically on the side of the product fill tube 24. The first and second piece of the sealing guide backup are attached at their uppermost end by a band (not shown) having an opening centered between the pieces through which the profile element is passed. The sealing guide backup 80 is positioned directly beneath the pre-form fin 78 and aids in properly applying a reclosable profile element to the packaging film 15.

Additionally, adjacent to the product fill tube 24 is a profile sealer 82. Preferably, the profile sealer 82 includes two seal bars 84 and 86 which supply heat in a conventional manner. The profile sealer 82 supplies the fusion energy necessary to adhere the reclosable profile element 30 to the packaging film 15. The seal bars 84 and 86 of the profile sealer 82 are positioned on opposite sides of the sealing guide backup 80 and, when actuated, seal the reclosable profile element 30 to the packaging film 15.

Attached at the lowermost end of the product fill tube 24 is a pair of bag spreaders 28 (FIG. 1). Generally, the bag spreaders 28 are metal wires. One wire extends from the end of the product fill tube 24. The second wire extends from the lowermost end of the sealing guide backup 80. The bag spreaders 28 are designed to spread and flatten the tube of packaging film 15.

Directly beneath the bag spreaders 28 is a jaw-pull device 88 of conventional design. The jaw-pull device 88 has cross sealing jaws. The jaw-pull device 88 advances both the packaging film 15 and reclosable profile element 30. Preferably, the cross sealing jaws also form the top seal of one package and the bottom seal of the next package as the film is advanced. The cross sealing jaws form the top and bottom seals 89 (FIG. 1a) in the packaging film 15 in a known manner substantially similar to the manner in which the heat seal apparatus 60 seals the packaging film into a tubular form.

In accordance with the preferred embodiment of the present invention, a reclosable profile element 30 having male and female cooperating elements and flanges 32 is threaded downward along the vertical length of the form, fill and seal apparatus. Preferably, the reclosable profile element 30 is threaded downward between the product fill tube 24 and the forming tube 22, along the outer perimeter of the product fill tube 24, as shown in FIG. 2. The reclosable profile element 30 is guided into a loop of packaging film and adhered to the inner surface of the loop, detail of this will be described later in connection with FIGS. 7, 7a, and 8.

Preferably in advance of threading the reclosable profile element into the form, fill and seal apparatus, a portion of the profile element 30 is punched out and pre-punch seals are formed. As the reclosable profile element 30 is fed from a suitable supply 14 (FIG. 1) to the form, fill and seal apparatus, is it threaded through a pre-punch seal apparatus 40. Preferably the pre-punch seal apparatus 40 forms a pair of heat seals 41 in the profile element that are incrementally spaced. The pre-punch seal apparatus forms the seals 41 in the profile element 30 to lock the male and female members of the profile element 30 together. Accordingly, the seals 41 are formed to prevent slippage of one member of the profile element relative to the other, along their length, as the profile element 30 is advanced.

Referring now to FIG. 3, a cross-section of the pre-punch seal apparatus 40 is shown. The profile element 30 is guided through the bottom 42 of the pre-punch seal apparatus 40. A pair of heated cartridges 44, surrounded by an insulating material 48, each supports a heated probe 46. The probes 46 are intermittently forced downward into the profile element 30 as the profile element 30 is guided through the bottom 42 of the apparatus.

Accordingly, at incremental time intervals, synchronized with the dwell period during the jaw-pull cycle, the heated probes 46 are extended simultaneously through the upper flange 32 and upper cooperating element 36 of the profile element 30 and into a portion of the lower cooperating element 38 of the profile element 30. The heated probes 46 thus form the pair of seals 41 in the profile element 30. The seals 41 may be spaced at a distance slightly greater than the width of the combined top and bottom cross-seals 89 formed by the jaw-pull apparatus 88. Optionally, the spacing between the seals 41 may be varied according to specifications of the package desired.

After the heated probes 46 are retracted from the profile element 30, the element is guided through a punch device 50, depicted in FIGS. 1 and 4. The punch device 50 removes portions of the flanges 32 and 34 and cooperating elements 36 and 38 of the profile element 30. The profile is passed through the bottom 52 of the punch device 50. At intervals while the profile is stationary, a punch 54 is extended through the profile element 30 to sever out a rectangular area 51. The rectangular area 51 cut away from the profile element is shown in FIG. 5. Preferably an air-cylinder 56 is used to actuate the punch 54.

The rectangular areas 51 punched out of the profile element 30 are incrementally spaced to be in between the heat seals 41 and in register with the cross seals 89 formed by the jaw-pull device 88 as the packaging film is formed into a package. Accordingly, where the cross seals 89 are formed, the mass of the cooperating elements 36 and 38 is not present. This makes it easier for the jaw-pull cross sealers to form hermetic cross seals 89.

Referring now to FIG. 6, in forming the packaging film 15 into a tubular shape about the forming tube 22, marginal edges 16 and 17 of the web of packaging film 15 are brought together to be sealed. Preferably, the sealing is a heat seal process. Seam seal bars 62 and 64 exert an external pressure along the vertical length of the edges 16 and 17 of the film 15 to form a fin seal 19 (FIG. 1a). Optionally, a lap seal may be used to seal the packaging film into a tubular form. Lap seals are known in the art and therefore not discussed in detail. Edges of single layer or multiple layer film may be sealed in this manner.

FIG. 1a illustrates a pillow product filled package having reclosable profile elements made in accordance with the present invention. A pillow product filled package is constructed by forming the cross seals 89 such that the package has the fin seal 19 on the face, rather than on one of the sides of the package. Optionally, a pillow product filled package may be constructed by forming a lap seal in place of the fin seal 19.

After the fin seal 19 is formed, the packaging film 15 is advanced downward from the forming tube over the exposed portion of the product fill tube 24. As noted above, the product fill tube 24 has a lesser outer perimeter than the outer perimeter of the of the forming tube 22. As the film 15 is advanced, an excess of film is made available due to the differences in outer perimeters of the forming tube 22 and product fill tube 24. The film shaper apparatus 70 guides the film 15 to conform to the outer perimeter of the product fill tube 24 and guides the excess film to form a loop of film 18 running generally parallel to the axis of the tube of film, as seen in FIGS. 1 and 7. The spring 76 mounted between the hook-like extensions 73 and 74 of the film shaper applies pressure to the arms 71 and 72 of the shaper such that the arms 71 and 72 encompass the packaging film 15 as it is advanced downward over the product fill tube 24. The loop 18 of the packaging film 15 is formed in the opening between the arms as it is advanced over the pre-form fin 78. Accordingly, the pre-form fin 78 initiates orientation of the loop 18 to smooth advancement of the loop 18 over the sealing guide backup 80 (FIG. 8). The reclosable profile element 30 is threaded downward to one side of the pre-form fin 78 and into the loop 18 of packaging film (FIG. 7a).

Referring now to FIG. 8, as the profile element 30 is guided into the loop 18, the flanges 32 and 34 of the profile are oriented on either side of the sealing guide backup 80. The sealing guide backup 80, located adjacent to the product fill tube 24, provides a rigid sealing backup for adhesion of the profile 30 to the film 15. As shown in FIG. 8, the two pieces of the backup 80 are spaced so that the cooperating elements 36 and 38 can remain mated as the profile element 30 passes down the sealing guide.

Generally, the profile element 30 is adhered to the inner surface of the loop 18 by a heat sealing process. Preferably, a profile sealed 82 having heated seal bars 84 and 86 seals the outside of the profile element 30 to the two inside surfaces of the film loop 18 by supplying a squeezing pressure inward toward each other. Preferably, only a single actuator is used to supply this pressure. Use of a single actuator prevents damage to the sealing guide backup 80, which may result if the two seal bars 84 and 86 were actuated separately.

As the packaging film and profile assembly is advanced, it is drawn over a pair of bag spreaders 28 by the jaw pull device 88, as illustrated in FIG. 1. The bag spreaders spread the assembly as flat as possible to permit better sealing of the top and bottom seams of the package.

The jaw pull device 88 has cross sealing bars that heat seal the packaging film and profile assembly. The jaw pull device 88 also includes conventional severing means for cutting the film 15 between a top seal in one assembly and a bottom seal in the next advancing assembly. Prior to forming the top seal on each package, a product is funneled down the product fill tube 24 and into the packaging film and profile assembly already having a bottom cross seal.

If desired, a tear string 31 may be optionally fed alongside the profile strip 30 into the loop of film 18. The tear string 31 then aids in opening the resultant package.

Alternatively, in another preferred embodiment of the present invention, the form, fill and seal apparatus is substantially similar to the form, fill and seal apparatus illustrated in FIG. 1 and described with respect thereto. However, in this preferred embodiment, the film shaper 70 and the pre-form fin 78 are not included. Instead, as the packaging film 15 advances from the forming tube 22 to the product fill tube 24, the film 15 is deformed to contour to the outer perimeter of the product fill tube 24 by also shifting to surround the sealing guide backup 80. The sealing guide backup 80 facilitates forming the loop of packaging film 18 into which the reclosable profile element 30 is threaded. The profile element 30 is guided into the loop 18 by being threaded through the sealing guide backup 80. The profile element 30 is adhered to the inner surface of the loop 18 as previously described. Since there is no preform fin, the top of the sealing guide backup 80 in this embodiment must be free of sharp edges to avoid damaging the film.

Another embodiment of the invention is shown in FIGS. 9-10. Most components of the form, fill and seal apparatus illustrated in FIG. 9 are substantially similar to components of the form, fill and seal apparatus illustrated in FIG. 1. These components are denoted with the same reference numeral, increased by a factor of 100. For example, the forming shoulder 120 of the embodiment illustrated in FIG. 9 is substantially similar to the forming shoulder 20 illustrated in FIG. 1. (In FIG. 9, the packaging film is broken away to show the band 181 connecting the two pieces of the sealing guide backup 180.)

In the alternative embodiment of the present invention illustrated in FIG. 9, the packaging film 115 is advanced downwardly over the form, fill and seal apparatus through engagement of the outer surface of the film 115 by a pair of frictional or vacuum belts 190 diametrically opposite one another. The pair of belts 190 are constructed essentially identical such that equal and opposite forces are applied to the film 115 as it is advanced downwardly. Such belts are well known in form, fill and seal apparatus. In this embodiment, each belt is positioned adjacent to the product fill tube 124 and is spaced 90° around the circumference of the fill tube 124 from where the profile element 130 is adhered to the film 115 by the profile sealers 184 and 186.

FIG. 9a illustrates a three sided seal product filled package having reclosable profile elements made in accordance with the apparatus of FIG. 9. The three sided seal package is constructed by forming the fin seal 119 in the packaging film diametrically opposite from the film from which the loop 118 having the reclosable profile element 130 is formed. Also, the cross seal jaws 188 are positioned to form the cross seals 189 so that the resulting package has the fin seal 119 on one of the side edges of the package.

Optionally, a three-sided seal product fill package having reclosable profile elements may be constructed by forming a lap seal in the packaging film instead of a fin seal. Accordingly, such a lap seal of three-sided seal package is formed 180° from where the loop 118 and reclosable profile element 130 is positioned.

FIG. 10 shows how the reclosable profile element 130 is threaded into the loop 118 of excess packaging film which is formed in a manner substantially similar to that described previously. The reclosable profile element is adhered to the inner surface of the loop 118 by the profile sealing bars 184 and 186.

FIG. 10 also shows the fin seal 119 spaced 180° from the loop 118 of excess packaging film. In this preferred embodiment, the heat seal apparatus 160, which seals the packaging film into a tubular form, is located adjacent to the product fill tube 124, positioned 90° from each frictional or vacuum belt 190. By locating the heat seal apparatus 160 at least partially longitudinally adjacent to the profile sealer and the product fill tube 124, the length of the forming tube, and thus the overall height of the machine, may be reduced.

Figure 11:
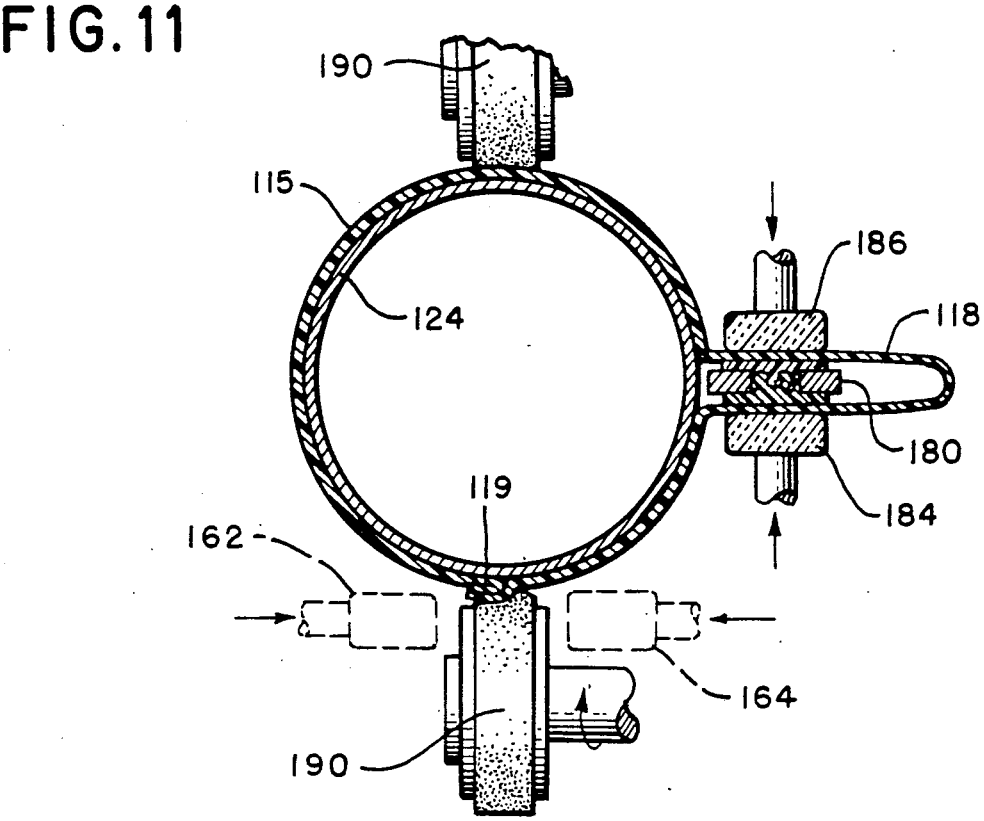
FIG. 11 is a cross-sectional view illustrating a portion of an alternative preferred embodiment similar to the embodiment of FIG. 9.

Referring now to FIG. 11, a cross-sectional view of an alternative preferred embodiment of the present invention is shown. FIG. 11 depicts a cross-sectional view of a form, fill and seal apparatus substantially similar to that of FIG. 9. However, in this preferred embodiment, the heat seal apparatus (not shown) is located adjacent to the forming tube 124 and the fin seal 119 is formed 90° from where the profile is attached. As the film 115 is deformed over the product fill tube 124, one of the pair of belts 190 is aligned to come in contact with the fin seal 119. Also, the cross seal jaws are located directly underneath each belt drive. Accordingly, the resulting reclosable package made in accordance with this preferred embodiment is a pillow product filled package substantially similar to the pillow package illustrated in FIG. 1a.

In another preferred embodiment of the present invention, the form, fill and seal apparatus is substantially similar to the form, fill and seal apparatus illustrated in FIGS. 9 or 11 and described with respect thereto. However, in this preferred embodiment, the film shaper 170 and the pre-form fin 178 are not included. Instead, the sealing guide backup 180 facilitates in forming the loop 118 into which the reclosable profile element 130 is threaded, as described earlier with the embodiment similarly modified from that shown in FIG. 1.

Either the pillow product filled package or three sided seam seal package can be formed in the apparatus without the film shaper and preform fin.

Another preferred embodiment of the present invention is partially shown in FIG. 12. Many components of the form, fill and seal apparatus of this preferred embodiment are substantially similar to components of the form, fill and seal apparatus illustrated in FIG. 1. The components of the preferred embodiment illustrated in FIG. 12 which are substantially similar to components illustrated in FIG. 1 are denoted with the same reference numeral, increased by a factor of 200. For example the forming shoulder 220 illustrated in FIG. 12 is substantially similar to the forming shoulder 20 illustrated in FIG. 1.

One of the differences between the embodiment of FIG. 12 and the earlier described embodiments is that the forming tube 222 is very short. Adjacent to the product fill tube 224, and below the lowermost end of the forming tube 222, is a heat sealing apparatus 268, which seals the packaging film into tubular form. The heat sealing apparatus illustrated in FIG. 12 includes a seam seal bar 269 and forms a lap seal.

Another difference between the embodiment of FIG. 12 and the earlier described embodiments is that the overall length of the product fill tube 224 is minimized from that of the earlier described embodiments.

Attached to the product fill tube 224 is a sealing guide backup 280 which is substantially similar to the sealing guide backup 80 of FIG. 1. Adjacent to the product fill tube 224 is a profile sealer 282, also substantially similar to the profile sealer described in FIG. 1.

Another major difference in this embodiment is the inclusion of a balancing fin 294, longitudinally extending outwardly from the fill tube 224 (best shown in FIGS. 14 and 15). The fin 294 is positioned 180° from the sealing guide backup 280. The fin 294 enables a lap seal to be formed in approximately the same plane of the fill, form and seal apparatus as the profile sealer 282 adheres the reclosable profile element 230 to the packaging film 215. FIG. 14 also illustrates how the packaging film conforms about the product fill tube 224, balancing fin 294, and sealing guide backup 280. As shown, the outer perimeter of the lower section of the central member in this embodiment is the shortest distance required to circumnavigate around the combined fill tube 224 and fin 294.

In accordance with this preferred embodiment, the packaging film 215 is formed about the forming shoulder 220 and advanced downward over the product fill tube 224. The balancing fin 294 provides symmetry in the film drag as it advances about the product fill tube 224. In this preferred embodiment, not only is the length of the forming tube 222 reduced, but the length of the product fill tube 224 is also minimized, resulting in a very compact form, fill and seal machine.

FIG. 12a illustrates a pillow product filled package made in accordance with this preferred embodiment. The pillow product filled package is constructed by forming the lap seal in the packaging film 90° from the loop 218 and reclosable profile element 230.

Referring now to FIG. 16, a perspective view of another embodiment is shown. In this preferred embodiment, the product fill tube 324 has an oblong shape. The forming collar 320 envelops the product fill tube 324 and produces an oblong shaped film tube. In this embodiment, the forming collar 320 terminates in inner perimeter which is larger than the outer perimeter of the product fill tube 324. Hence, the tube forming perimeter of the upper section of the form, fill and seal apparatus of this embodiment is the inside perimeter of the forming collar 320. No forming tube is utilized. The product fill tube 324 extends above and below the forming collar 320.

In this preferred embodiment, the packaging film 315 is feed from an unwind apparatus onto to the forming shoulder 320. The sheet of packaging film 315 conforms about the terminating perimeter of the forming shoulder. The film is then advanced along the length of the form, fill and seal apparatus. As the film 315 is advanced, it is deformed to conform to the outer perimeter of the product fill tube 324 and creates a loop 318 about a sealing guide backup 380 (FIG. 18). Preferably, a lap seal is made in the film by a lap sealer 368 after the film has advanced from the forming collar to the product fill tube 324. Optionally, a lap seal or fin seal may be applied when the packaging film is formed about the forming shoulder 320.

Referring now to FIG. 17, the reclosable profile element 330 is threaded downward along the vertical length of the form, fill and seal machine 310. Preferably, the reclosable profile element is threaded downward between the product fill tube 324 and the forming shoulder 320, along the outer perimeter of the product fill tube 324.

The use of an oblong product fill tube enables a lap seal to be formed in approximately the same plane of the fill, form and seal apparatus as that at which the profile sealer adheres the reclosable profile element to the packaging film. Additionally, the use of an oblong product fill tube increases the fill tube cross-sectional area over that of a form, fill and seal apparatus having a round product fill tube and balancing blade.

When packaging with an inert atmosphere is desired, any of the foregoing embodiments may be fitted with gas flush lines as is conventional. In addition, it is preferable to run a gas flush tube along the line of travel of the profile element to terminate in the vicinity of the sealing guide backup. Such a gas flush tube may be formed in a shape to assist in forming the loop of film into which the reclosable profile is threaded.

It should be appreciated that the apparatus and methods of the present invention are capable of being incorporated in the form of a variety of embodiments, only a few of which have been illustrated and described above. The invention may be embodied in other forms without departing from its spirit or essential characteristics. For example, instead of using separate forming and product fill tube, a single tube having a lower section with a reduced diameter, and hence reduced perimeter, could be utilized. The top section would act as a combined forming and fill tube, and as the product traveled down the tube it could be funneled into the smaller diameter section.

For this reason, the described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

We claim:

1. An apparatus for applying a reclosable profile element to a packaging film in a form, fill and seal packaging operation comprising:
   (a) a central member having an upper section and a lower section, said upper section including means for forming a longitudinally extending web of packaging film with marginal edges into a tube about a perimeter of said upper section, said lower section having an outer perimeter less than the tube forming perimeter of said upper section;
   (b) means for generating a loop in the packaging film, said loop running generally parallel to the axis of the tube, and said loop utilizing packaging film in excess of the portion of the tube required to conform the tube to the outer perimeter of the lower section;
   (c) means for threading a reclosable profile element into said loop of packaging film; and
   (d) means for adhering said reclosable profile element to the inner surface of said loop of packaging film.

2. The apparatus of claim 1 further having a means for advancing said packaging film from the upper section to the lower section of said central member.

3. The apparatus of claim 2 wherein the loop generating means comprises a film shaper having an inner perimeter substantially the same as the perimeter of said lower section of said central member, said film shaper having a spring for applying pressure to said packaging film as the film advances past the film shaper, said pressure being effective to direct the excess of packaging film made available due to the difference in the outer perimeter of the lower section and the tube forming perimeter of said upper section to form said loop of packaging film.

4. The apparatus of claim 1 wherein the adhering means comprises a profile sealer adjacent to said lower section of the central member and having a means for providing fusion energy sufficient to adhere said profile web to said packaging film.

5. The apparatus of claim 1 wherein the forming means comprises a forming shoulder and a means adjacent the upper section of the central member for sealing the marginal edges of the packaging film to each other.

6. The apparatus of claim 1 wherein the upper section comprises a forming collar, and the lower section comprises a fill tube positioned inside of and extending below the forming collar.

7. The apparatus of claim 6 wherein the threading means guides the reclosable profile from a supply means to a position between the fill tube and the forming collar.

8. The apparatus of claim 6 wherein the forming collar terminates on a forming tube, the outer perimeter of the forming tube comprising the tube forming perimeter of the upper section, and the forming tube extending below the forming collar only a portion of the distance toward the bottom of the fill tube.

9. The apparatus of claim 2 wherein the advancing means comprises jaw pull elements below the bottom of the lower section of the central member.

10. The apparatus of claim 2 wherein the advancing means comprises belt drives adjacent the central member.

11. The apparatus of claim 5 wherein the edge sealing means produces a lap seal.

12. The apparatus of claim 5 wherein the edge sealing means produces a fin seal.

13. The apparatus of claim 1 wherein the loop is formed in approximately the center of the web of packaging film.

14. The apparatus of claim 1 wherein the loop is formed so as to be positioned at about 90° around the perimeter of the packaging film tube from one of the marginal edges of the packaging film.

15. The apparatus of claim 5 wherein the edge sealing means is positioned longitudinally above the reclosable profile adhering means.

16. The apparatus of claim 5 wherein the edge sealing means is positioned at least partially longitudinally adjacent the reclosable profile adhering means.

17. The apparatus of claim 1 wherein the lower section comprises a fill tube and a longitudinally positioned fin extending outwardly from the fill tube, the perimeter of the lower section comprising the shortest distance required to circumnavigate around the combined fill tube and fin.

18. The apparatus of claim 1 wherein the fill tube has an oblong cross-sectional shape.

19. The apparatus of claim 1 wherein the reclosable profile element includes separable, interlocking fasteners on opposing flange elements, and the apparatus further includes means for removing portions of the interlocking fasteners from the reclosable profile strip prior to adhering the profile strip to the packaging film.

20. An apparatus for applying reclosable profile elements to a packaging film comprising:
   (a) a forming shoulder positioned to shape a web of packaging film into a tubular shape;
   (b) a product fill tube, said product fill tube located inside said tubular packaging film and extending beyond the bottom end of the forming shoulder, said product fill tube having an outer perimeter less than the perimeter of said tubular packaging film;
   (c) means for advancing said tubular shaped packaging film along the length of the fill tube;
   (d) means adjacent said product fill tube and below the bottom end of the forming shoulder for
      i) conforming said tubular packaging film to the outer perimeter of the product fill tube; and
      ii) forming the excess packaging film, made available due to the differences in the outer perimeter of the product fill tube and the perimeter of the tubular packaging film, into a loop;
   (e) means for guiding a reclosable profile element into said loop; and
   (f) means for adhering said reclosable profile element to the inner surface of said loop.

21. The apparatus of claim 20 wherein the advancing means comprises a means for applying an advancing force to the packaging film below the bottom end of said product fill tube.

22. The apparatus of claim 20 wherein the advancing means comprises a means for applying an advancing force to the packaging film along the outer perimeter of the product fill tube.

23. The apparatus of claim 20 further comprising means for removing portions of the reclosable profile strip in advance of where said strip is guided into said loop.

24. An apparatus for forming packages from packaging film and providing the packages with a pair of reclosable profile strips each comprising interlocking elements supported on profile flanges, the apparatus comprising:
   (a) a forming tube having an outer perimeter over which packaging film advances;
   (b) a forming shoulder shaped and positioned to guide flat packaging film with marginal edges into a tubular shape about said forming tube;
   (c) a means for joining the marginal edges of the packaging film to form said tubular shape;
   (d) a product fill tube located inside said forming tube and extending beyond the bottom end of the forming tube, said product fill tube having an outer perimeter less than said outer perimeter of said forming tube;
   (e) means for advancing said packaging film over said forming shoulder and along the length of the forming tube;
   (f) means for guiding the packaging film to conform to said outer perimeter of said product fill tube and thereby forming a loop of packaging film from the excess of film making up the tubular shape but not used to surround the product fill tube;
   (g) means for guiding a reclosable profile element between the inside of the forming tube and the outside of the product fill tube and into said loop;
   (h) a sealing guide, located adjacent to said product fill tube and having at least one vertical member positioned such that the flanges of said profile element are separated from one another by said vertical member;
   (i) a profile sealer having a means for adhering said profile flanges to said inner surface of said loop of packaging film; and
   (j) means for forming cross seals and severing the tubular material between the cross seals to form individual packages.

25. A method of applying a reclosable profile element to a packaging film comprising the steps of:
   (a) forming a web of packaging film over a shoulder and into a tubular shape about a central member having an upper section and a lower section;
   (b) joining marginal edges of the packaging film to form the film into a tube having a perimeter larger than the outer perimeter of the lower section;
   (c) advancing said tube of packaging film along the length of said central member;
   (d) forming a longitudinally extending loop in the packaging film from an excess of packaging film made available by conforming the tubular packing film to follow the outer perimeter of the lower section as the packaging film is advanced along the length of the central member;
   (e) threading a reclosable profile element along the length of the central member and into said loop; and
   (f) adhering said reclosable profile element to the inner surface of said loop.

26. The method of claim 25 wherein the loop is formed opposite the position on the tube where the marginal edges of the film are joined.

27. The method of claim 25 wherein the loop is formed at a position approximately 90° around the perimeter from where the marginal edges of the film are joined.

28. A method for applying reclosable profile elements to a packaging film comprising the steps of:
   (a) forming a packaging film over a forming shoulder and into a tubular shape about a forming tube;
   (b) advancing said tubular shaped packaging film along the length of said forming tube and over a product fill tube located inside said forming tube and extending beyond the bottom end of the forming tube, said product fill tube having an outer perimeter less than the outer perimeter of said forming tube;
   (c) deforming the tubular shape of the packaging film to create a loop, said loop being formed from an excess of packaging film made available as the packaging film is advanced between conforming to the outer perimeter of the forming tube and conforming to the outer perimeter of the product fill tube;
   (d) guiding a reclosable profile element along the length of the product fill tube and into said loop;
   (e) adhering said reclosable profile element to the inner surface of said loop.

29. A method for producing product filled packages having reclosable profile elements for reclosing the package once the package is opened, comprising the steps of:
   (a) forming a flat packaging film over a forming shoulder and into a tubular shape about a central member having an outer tube and an internal tube, said internal tube having an outer perimeter less than the outer perimeter of said outer tube, said internal tube extending beyond the bottom end of said outer tube;
(b) advancing the packaging film vertically downward along the length of the central member;
(c) threading a reclosable profile element along the length of the internal tube and inside the tubular shape of said packaging film;
(d) deforming the tubular packaging film to form a longitudinally extending loop of packaging film, said loop being formed from the packaging film made available as the packaging film is advanced between contacting the outer perimeter of the outer tube to contacting the outer perimeter of the internal tube extending beyond the bottom end of the outer tube;
(e) guiding the reclosable profile element along the vertical length of the internal tube of the central member and into said loop;
(f) adhering said reclosable profile element to the inner surface of said loop of packaging film.
(g) forming a cross seal in the tubular packaging film to form the bottom of the package;
(h) introducing product contents into the tubular packaging film above the cross seal;
(i) forming a second cross seal in the tubular packaging film to form the top of the package; and
(j) severing the package from the tubular packaging film.

* * * * *